United States Patent [19]

Anthony et al.

[11] 4,172,762
[45] Oct. 30, 1979

[54] HIGH EXPOSURE CONTROL ROD FINGER

[75] Inventors: Andrew J. Anthony, Tariffville, Conn.; Malcom D. Groves, Clearwater, Fla.; Richard H. Young, Canton, Conn.

[73] Assignee: Combustion Engineering, Inc., Windsor, Conn.

[21] Appl. No.: 871,061

[22] Filed: Jan. 20, 1978

[51] Int. Cl.² .............................................. G21C 7/10
[52] U.S. Cl. ............................................... 176/86 R
[58] Field of Search ............ 176/86 R, DIG. 5, 36 R

[56] References Cited

U.S. PATENT DOCUMENTS

| 3,030,294 | 4/1962 | Beaver | 176/86 R |
| 3,365,368 | 1/1968 | Fray | 176/86 R |
| 3,407,117 | 10/1968 | Lichtenberger | 176/86 R |
| 3,507,748 | 4/1970 | Fenech et al. | 176/86 R |
| 3,510,398 | 5/1970 | Wood | 176/86 R |

FOREIGN PATENT DOCUMENTS

| 835257 | 5/1960 | United Kingdom | 176/86 R |
| 926133 | 5/1963 | United Kingdom | 176/86 R |
| 931974 | 7/1963 | United Kingdom | 176/86 R |

*Primary Examiner*—Harvey E. Behrend
*Attorney, Agent, or Firm*—Lombro J. Ristas

[57] ABSTRACT

A nuclear reactor control rod containing a stack of $B_4C$ absorber pellets in which the pellets in the lower end have a radius smaller than that of the other pellets and are wrapped with a sleeve having a linear compressibility sufficient to accommodate exposure-induced radial expansion of the end pellets without producing excessive clad strain and having a thermal conductivity sufficient to keep the centerline temperature of the end pellets below the melting point of $B_4C$. One such sleeve material is a type 347 stainless steel having 22.5% theoretical density.

7 Claims, 2 Drawing Figures

HIGH EXPOSURE CONTROL ROD FINGER

BACKGROUND OF THE INVENTION

This invention relates to control rods for a nuclear reactor and more particularly to cylindrical control rods containing a stack of neutron absorbing pellets.

It is common, particularly in nuclear reactors of the pressurized water type (PWR), to control the power output and power distribution in the reactor core with control rods insertable from the top of the reactor into the fuel assemblies. These control rods are typically hollow metal tubes containing stacked pellets of uniformly shaped neutron absorbing poison material, usually $B_4C$. In the core, the control rods reciprocate within control rod guide tubes, which provide an unobstructed path within the core while helping maintain the structural dimensions of the fuel assemblies.

The inner diameter of the guide tubes is usually chosen to be the maximum permitted by the fuel assembly lattice in order that the maximum possible diameter control rod can be inserted therein. It is desirable to maximize the diameter of the $B_4C$ pellets in the control rod because the absorption effectiveness of the rods is very strongly dependent, particularly in thermal neutron reactors, on the surface area of the pellets. For this reason, and to promote heat transfer, there usually are narrow clearances between the $B_4C$ pellets and the control rod clad, and between the control rod and its guide tube. The gap between the $B_4C$ pellet and the clad must be large enough, however, to accommodate the swelling the pellets experience when they are irradiated while in the reactor core. It is very important that the swollen pellets not press too strongly against the clad wall because significant clad deformation can result in the control rod jamming in its guide tube. But if the gap is too large, chips that are dislodged from the $B_4C$ pellets as a result of the control rod reciprocation will settle in the gap in the lower tip of the rod and quickly deform the clad as the pellets in the tip swell.

The effective lifetime of a control rod is determined by the average cumulative radiation exposure over the length of the rod, and by the peak exposure at any point in the rod. The average exposure limitation relates to the integrated destruction of the B-10 absorber isotope in the $B_4C$, which can eventually render even a fully inserted rod ineffective in controlling the reactor. The peak radiation limit relates, as described above, to the local clad strain and the possibility of the control rod jamming in its guide tube. A major problem in the design of control rods for use in power reactors has been the economically unfavorable fact that the control rod peak exposure limit is experienced in the end of the control rod nearest the core well before the rod average exposure limit is approached. This results from the high irradiation the leading tip experiences even when the entire rod is out of the core and in the withdrawn position. To make the reactor vessel longer so that the tip of the rod can be farther from the core when in the withdrawn position, is too costly.

One prior art solution is to fill the lower end of the control rod with a slug of silver-indium-cadmium (Ag-In-Cd), which does not experience the high rate of swelling characteristic of $B_4C$. Ag-In-Cd is much more expensive than $B_4C$, however, and has slightly lower neutron absorption strength.

SUMMARY OF THE INVENTION

It is an object of the present invention to increase the useful lifetime of controls rods containing a column of neutron absorbing poison pellets that experience radiation induced expansion, without significantly increasing the fabrication cost, or decreasing the neutron absorbing properties, relative to rods filled with a uniform column of such pellets. It is another object of the invention to utilize $B_4C$ pellets in the lower end of top-mounted control rods in a manner that will mitigate the costly effect of having the peak radiation exposure in the lower end be the limiting factor in control rod life, yet will retain sufficient neutron absorbing strength in the lower end. It is a further object to prevent pellet chips from becoming lodged between the pellets in the lower end and the adjacent clad.

According to the invention, at least one of the pellets in the leading end of the control rod has a slightly reduced radius relative to the other pellets in the rod. A sleeve is circumferentially wrapped around the smaller pellets before they are inserted into and sealed within the rod. The sleeve is made from material that is sufficiently linearly compressible to accommodate the exposure-induced expansion of the pellets during the lifetime of the control rod, without producing stress on the clad that will violate the design limit clad strain. The present invention permits the control rod lifetime to be set by constraints other than control rod tip exposure. In the preferred embodiment, the sleeve has a minimum thermal conductivity sufficient to keep the pellet centerline temperature below the melting point of $B_4C$ when the control rod tip is located in the highest allowable full power peak neutron flux in the reactor core. One satisfactory sleeve material is type 347 stainless steel in the form of 22.5% theoretical density porous metal.

DESCRIPTION OF THE PREFERRED EMBODIMENT

Figure 1:
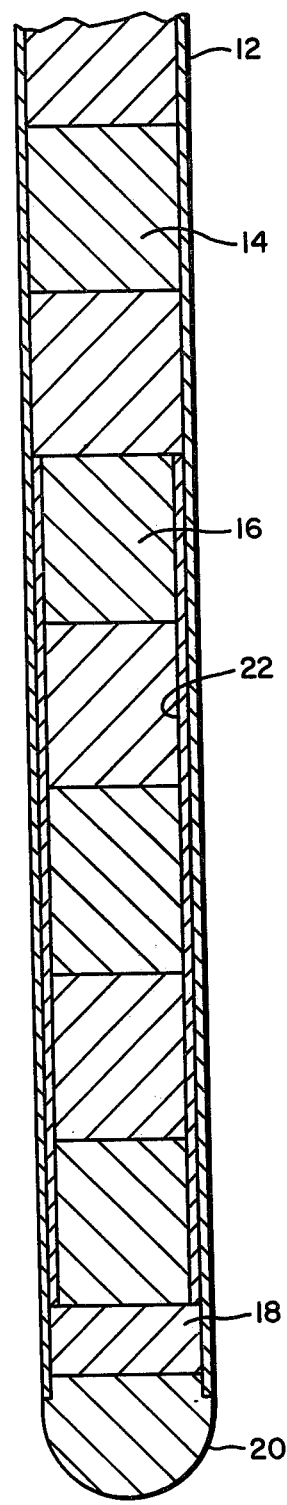
FIG. 1 in cross section the lower end of a control rod containing the preferred embodiment of the invention.

FIG. 1 shows a control rod 10 comprising a cylindrical clad 12 in which are stacked $B_4C$ absorber pellets 14, 16. In a typical nuclear reactor the stack of pellets 14 extends upward for 12 feet or more, but only the lower portion of the rod 10 is of concern in the present embodiment. Approximately 10 inches of the lower portion of the rod 10 contains $B_4C$ pellets 16 having a smaller radius than the remainder of the pellets 14. Depending on the particular reactor design, the smaller radius pellets may extend over a distance of up to about 18 inches. The pellets 14 and 16 are sealed within the clad 12, the lower seal 20 being welded to the clad 12 and separated from the end pellets 16 by a spacer 18 having a radius substantially that of the clad inner radius. The end pellets 16 are circumferentially wrapped with a metallic integral sleeve 22 which, in the preferred embodiment, substantially fills the space between the end pellets 16 and the clad 12.

Figure 2:
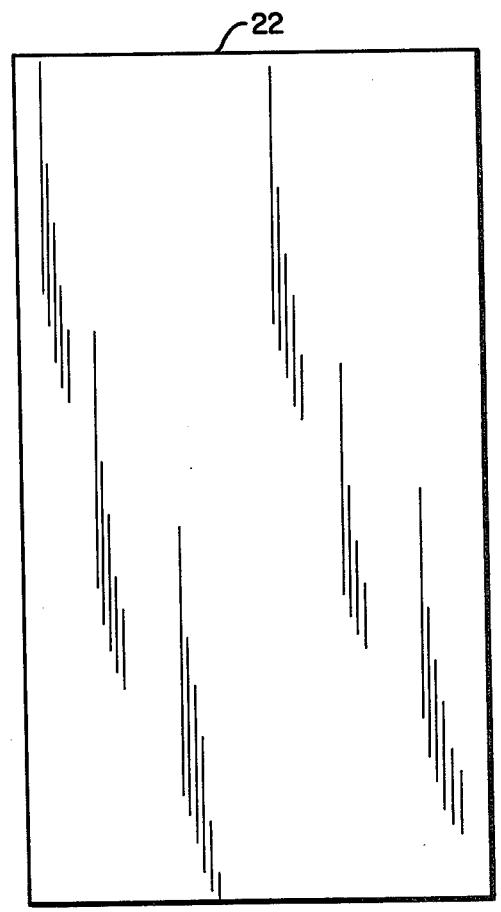
FIG. 2 shows the integral circumferential sleeve prior to being wrapped around the end pellets of the control rod.

FIG. 2 shows the sleeve 22 prior to insertion in the control rod 10. The pellets 16 are wrapped with the sleeve 22 and the combination is inserted into the clad 12 before the end cap 20 and spacer 18 are welded in place. As shown in FIG. 1, the upper portion 24 of the sleeve 22 abuts the bottom surface 26 of the lowermost regular pellets 16 and is thereby restricted from sliding out of proper position.

When the control rod 10 is in the withdrawn position relative to the reactor core (not shown) the end cap 20 is only a few inches from the fuel, and the lower end of the rod 10 is irradiated by a substantial neutron flux. The flux decreases sharply with distance from the reactor core such that at a point in the control rod 10 about a foot from the end cap 20, the problem to which the invention is addressed becomes of minimal importance. When exposed to a neutron flux, the $B_4C$ pellets expand at a rate approximately proportional to the number of neutron absorptions occurring in the $B_4C$ pellets. Thus, even with the control rod withdrawn above the reactor core, neutrons continue to be absorbed at a significant rate in the lower end pellets 16. The sleeve 22 accommodates this expansion by compressing as the end pellets 16 expand so that little of the pellets expansion force is transmitted to the clad 12. As described above, the clad 12 is not permitted to expand significantly because of the possibility it will jam in its control rod guide tube (not shown). The maximum permitted clad strain is determined for each reactor during the licensing proceedings.

Use of the present invention therefore permits the end pellets 16 in the lower portion of the control rod 10 to experience a substantially higher integrated exposure than the remainder of the control rod pellets 14, without unduly limiting the useful lifetime of the rod 10. The upper portion of the control rod 10 receives significant exposure only when the rod 10 is inserted in the reactor core, but the lower portion receives radiation not only when it is in the reactor core, but also as discussed above, when the rod 10 is withdrawn from the core.

Some control rods in nuclear reactors are used not only for quickly shutting down the reactor by means of rapid and full length insertion, but also for regulating the shape of the neutron flux and the power output in the core. These control rods are frequently manipulated into and out of the reactor core as part of normal plant operating procedures. This manipulation causes small chips and particles of $B_4C$ from the stack of pellets 14 to work their way down into the lower portion of the rod 10 and, in the absence of an effective barrier, to fill portions of the gap between the lower pellets 16 and adjacent clad 12. Such entrapped chips quickly deform or perforate the clad 12 upon expansion of the pellet after relatively little neutron exposure. As shown in FIG. 1, the sleeve 22 can be sized to serve as an effective barrier to prevent significant movement of any matter from the regular pellets 14 to the end pellets 16.

Control rods used for regulating the power must be capable of withstanding the heat generated in the $B_4C$ pellets when they are exposed to the maximum permitted full power neutron fluxes. It is likely that the control rod end region will in some cases be in the peak neutron flux of the reactor core, and thus the sleeve 22 must have thermal conducting properties that will enable the heat generated in the end pellets 16 to be dissipated through the clad 12, without the temperature of the end pellets exceeding design limit values, typically the melting temperature of $B_4C$. A problem arises in this connection since materials having the desirable compressibility for sleeve 22 usually lack the desired thermal conductivity.

In the preferred embodiment of the invention, sleeve material made from 22.5% theoretical density type 347 stainless steel has been found to provide the minimum acceptable thermal conductivity and also to provide satisfactory compressibility. In a typical control rod design wherein the stainless steel clad inner diameter is 0.745 inches and the clad thickness is 0.036 inches, a sleeve thickness of 0.032 inches and end pellet diameter of 0.674 inches have been found to give satisfactory results. Assuming a design limit on clad stress of 65,000 psi (hot unirradiated yield strength), 65% of the B-10 atoms may be consumed by neutron absorption with a resulting 6.5% increase in pellet diameter, before this stress limit is reached. Destruction of all B-10 atoms would produce about 10% increase in pellet radius. The $B_4C$ pellet centerline temperature under the assumption that a new control rod is inserted into the reactor core such that the end region is exposed to a steady state thermal reactor total flux of $3.0 \times 10^{14}$ neutrons per second per square centimeter, is 2,200° F., which is below the $B_4C$ melting temperature of 2,500° F. The compressibility of the 22.5% theoretical density type 347 stainless steel sleeve 22 is characterized by approximately 50 percent continuous load deflection for an applied stress of 5,000 to 6,000 psi. This material has a minimum thermal conductivity of 3.5 BTU per hour per square foot per degree F. For the particular embodiment shown in FIG. 1, improvement in rod lifetime can be expected with any sleeve material having a thermal conductivity of at least 3.00 BTU per hour per square foot per degree F. and a minimum linear compression rate of 1.0 percent per 1,000 psi continuous load deflection. Type 347 stainless steel having a range of theoretical density between 15 percent and 30 percent has been found to be a satisfactory material for most PWR applications. Satisfactory sleeves can also be made from essentially pure fibrous nickel. Porous type 347 stainless steel is available from commercial sources such as the Technetics Division of the Brunswick Corporation. The compressibility and thermal conductivity required in specific reactors will depend on the neutron flux in the core and at the core boundary, the desired lifetime of the control rod, the reactivity worth required in the rod, and the dimensions of the rod. The balancing of these factors in order to choose the optimum sleeve is well within the ordinary skill of practitioners of this art.

What is claimed is:

1. In a nuclear reactor control rod having a sealed cylindrical cladding of inside radius R1 within which are stacked a plurality of poison absorber pellets having outside radius R2 substantially equal to R1, wherein the improvement comprises:
   at least one of the pellets at the leading end of the rod having a radius R3 less than R2; and
   a sleeve circumferentially wrapped around said end pellets, said sleeve having a thickness substantially equal to R2 minus R3 and a minimum linear compressibility of 1.0 percent per 1,000 psi continuous load.

2. The control rod of claim 1 wherein said sleeve is integral.

3. The control rod of claim 1 wherein said end pellets are made of $B_4C$.

4. The control rod of claim 3 wherein said sleeve has a thermal conductivity sufficient to keep the centerline temperature of said end pellets below the melting point of $B_4C$ when said end pellets are located in a thermal reactor spectrum steady state total neutron flux of $3.0 \times 10^{14}$ neutrons per second per square centimeter.

5. The control rod of claim 3 wherein said sleeve has a minimum thermal conductivity of 3.0 BTU per hour per square foot per degree F.

6. The control rod of claim 3 wherein said sleeve material is type 347 stainless steel having a density between 15% and 30% of theoretical.

7. The control rod of claim 6 wherein said sleeve material is type 347 stainless steel having a density of approximately 22.5 percent of theoretical.